(12) United States Patent
Lee et al.

(10) Patent No.: US 10,624,022 B2
(45) Date of Patent: Apr. 14, 2020

(54) METHOD FOR ESTABLISHING WIRELESS LAN COMMUNICATION CONNECTION AND ELECTRONIC DEVICE THEREFOR

(71) Applicant: Samsung Electronics Co., Ltd., Suwon-si, Gyeonggi-do (KR)

(72) Inventors: Tae-Young Lee, Seoul (KR); Bong-Jhin Shin, Suwon-si (KR); Han-Su Kang, Seoul (KR); Chil-Youl Yang, Anyang-si (KR); Myoung-Hwan Lee, Suwon-si (KR); Chun-Ho Lee, Suwon-si (KR); Jae-Eun Kang, Suwon-si (KR); Kang-Jin Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 14/915,487

(22) PCT Filed: Aug. 29, 2014

(86) PCT No.: PCT/KR2014/008064
§ 371 (c)(1),
(2) Date: Feb. 29, 2016

(87) PCT Pub. No.: WO2015/030519
PCT Pub. Date: Mar. 5, 2015

(65) Prior Publication Data
US 2016/0212692 A1 Jul. 21, 2016

(30) Foreign Application Priority Data

Aug. 30, 2013 (KR) .................. 10-2013-0104414
Aug. 25, 2014 (KR) .................. 10-2014-0110690

(51) Int. Cl.
*H04W 48/16* (2009.01)
*H04W 76/10* (2018.01)
(Continued)

(52) U.S. Cl.
CPC .......... *H04W 48/16* (2013.01); *H04W 48/14* (2013.01); *H04W 76/10* (2018.02); *H04W 84/12* (2013.01)

(58) Field of Classification Search
CPC ..... H04W 48/14; H04W 48/16; H04W 76/02; H04W 84/12
See application file for complete search history.

(56) References Cited

U.S. PATENT DOCUMENTS

2005/0188028 A1 8/2005 Brown, Jr. et al.
2005/0237962 A1* 10/2005 Upp ..................... H04W 8/26
370/313

(Continued)

FOREIGN PATENT DOCUMENTS

JP 2009 049922 A 3/2009
KR 10-2006-0105781 A 10/2006
(Continued)

OTHER PUBLICATIONS

IEEE 802.11-12/0572r1, Selective transmission of the Probe Response for 11ai Spec Framework.
(Continued)

*Primary Examiner* — Khaled M Kassim
*Assistant Examiner* — Zhaohui Yang
(74) *Attorney, Agent, or Firm* — Jefferson IP Law, LLP

(57) ABSTRACT

The present invention relates to a method for establishing a wireless LAN (WLAN) communication connection and an electronic device therefore. The method for establishing a WLAN communication connection in a device may comprise the steps of: receiving a probe request message from
(Continued)

another device; and selectively transmitting a response signal in response to the probe request on the basis of at least one of information included in the received probe request message and internal information of the device.

18 Claims, 17 Drawing Sheets

(51) Int. Cl.
*H04W 48/14* (2009.01)
*H04W 84/12* (2009.01)

(56) References Cited

U.S. PATENT DOCUMENTS

| | | | | |
|---|---|---|---|---|
| 2006/0111103 | A1 | 5/2006 | Jeong et al. | |
| 2008/0320108 | A1* | 12/2008 | Murty | H04W 48/20 709/220 |
| 2009/0290520 | A1* | 11/2009 | Roberts | H04W 48/10 370/311 |
| 2010/0110949 | A1* | 5/2010 | Lundsgaard | H04W 48/16 370/311 |
| 2010/0322213 | A1* | 12/2010 | Liu | H04W 48/16 370/338 |
| 2011/0122849 | A1 | 5/2011 | Jain et al. | |
| 2011/0243112 | A1* | 10/2011 | Misumi | H04W 76/10 370/338 |
| 2012/0054493 | A1 | 3/2012 | Bradley | |
| 2012/0134349 | A1 | 5/2012 | Jung et al. | |
| 2012/0177022 | A1* | 7/2012 | Ichikawa | H04W 48/08 370/338 |
| 2012/0322481 | A1* | 12/2012 | Laroche | H04W 48/16 455/509 |
| 2013/0111044 | A1 | 5/2013 | Cherian et al. | |
| 2013/0188628 | A1 | 7/2013 | Lee et al. | |
| 2013/0231151 | A1* | 9/2013 | Kneckt | H04W 40/246 455/515 |
| 2015/0146568 | A1* | 5/2015 | Jeong | H04W 48/14 370/254 |
| 2015/0146602 | A1 | 5/2015 | Buckley et al. | |

FOREIGN PATENT DOCUMENTS

| | | |
|---|---|---|
| KR | 10-2012-0032298 A | 4/2012 |
| KR | 10-2012-0056533 A | 6/2012 |
| KR | 10-2012-0096520 A | 8/2012 |
| WO | 2013 062586 A1 | 5/2013 |

OTHER PUBLICATIONS

Chinese Office Action dated Jul. 17, 2018 in Chinese Application 201480060073.8.
Chinese Office Action dated Feb. 25, 2019 in Chinese Application 201480060073.8.

* cited by examiner

METHOD FOR ESTABLISHING WIRELESS LAN COMMUNICATION CONNECTION AND ELECTRONIC DEVICE THEREFOR

TECHNICAL FIELD

The present invention relates to a method and an apparatus for responding in response to a probe request for a Wireless LAN connection in a WLAN system.

BACKGROUND ART

According to the development of a Wireless Local Area Network (WLAN) technology, a device supporting a communication using a WLAN is explosively increasing. For example, a smart phone supporting a Wi-Fi technology, smart appliances, and the like are increasing. Accordingly, the number of WLAN devices per the same WLAN area is increasing.

In a WLAN system, devices positioned within a specific scope share a resource. Therefore, when a plurality of WLAN devices are included in the specific scope, a resource that is usable by each device positioned in a corresponding area is reduced. Furthermore, when the plurality of WLAN devices are included in the specific scope, the amount of interference between the plurality of WLAN devices increases due to the signal transmission and reception of each device positioned in the corresponding area.

FIG. 1 illustrates a configuration of a WLAN system transmitting and receiving a probe request signal and a probe response signal according to the prior art. Referring to FIG. 1, in the WLAN system, one network includes one Access Point (AP) 100, a plurality of Group Owners (GOs) 110-1 to 110-N, and a plurality of WLAN devices 120-1 to 120-M. Each WLAN device 120-1 to 120-M broadcasts 130 a probe request signal in order to search for an AP or GO positioned on the periphery. At this time, all devices (that is, the AP 100 and the GOs 110-1 to 110-N) receiving the probe request signal transmit 140-1 to 140-N a probe response message to a corresponding WLAN device in order to inform of the existences thereof. That is, all APs and/or GO receiving the probe request message transmits the probe response signal to the corresponding WLAN device, and thus network traffic increases rapidly in a moment. Therefore, the amount of available resources of the WLAN devices that are included in the same area at a corresponding time point is reduced, and an interference amount of the WLAN devices that are included in the same area at the corresponding time point is increased.

DETAILED DESCRIPTION OF THE INVENTION

Technical Problem

Thus it is necessary to propose a method for a resource efficiency improvement and an interference reduction in a WLAN system.

Therefore, an embodiment of the present invention is to propose a method and an apparatus for increasing resource efficiency and reducing interference by reducing a control message of a MAC layer in a WLAN system.

Another embodiment of the present invention is to propose a method and an apparatus for selectively transmitting a probe response message from a device of a WLAN system.

Another further embodiment of the present invention is to propose a method and an apparatus for selectively transmitting a probe response message using information included in a probe request message from a device receiving the probe request message.

Another further embodiment of the present invention is to propose a method and an apparatus for selectively transmitting a probe response message using information recorded in a device from a device receiving the probe request message.

Another further embodiment of the present invention is to propose a method and an apparatus for transmitting a message including information on quality of a request service from a device.

Another further embodiment of the present invention is to propose a method and an apparatus for selectively transmitting a probe response message whether a device receiving a probe request message may provide service quality requested by a counterpart device that transmits the probe request message.

Technical Solution

According to an embodiment of the present invention, a method of a device for a Wireless LAN (WLAN) connection in a WLAN system comprises receiving a probe request message from another device; and selectively transmitting a response signal in response to the probe request based on at least one of information included in the received probe request message and internal information of the device.

According to an embodiment of the present invention, a device for a Wireless LAN (WLAN) connection in a WLAN system comprises: a communication module that communicates with at least another device; and a control unit that controls to receive a probe request message from another device through the communication module, and to selectively transmit a response signal in response to the probe request based on at least one of information included in the received probe request message and internal information of the device.

According to an embodiment of the present invention, a method of a device for a Wireless LAN (WLAN) connection in a WLAN system comprises: sensing a WLAN connection event by at least one application execution; and broadcasting a probe request message for the WLAN connection, and the probe request message includes at least one of address information of the device, type information of the device, authentication information of the device, vendor information of the device, a request data transmission rate of the device, and algorithm operation information of the device.

According to an embodiment of the present invention, a device for a Wireless LAN (WLAN) connection in a WLAN system comprises: a communication module that communicates with at least another device; and a control unit that controls to sense a WLAN connection event by at least one application execution, and to broadcast a probe request message for the WLAN connection, and the probe request message includes at least one of address information of the device, type information of the device, authentication information of the device, vendor information of the device, a request data transmission rate of the device, and algorithm operation information of the device.

MODE FOR CARRYING OUT THE INVENTION

Figure 1:
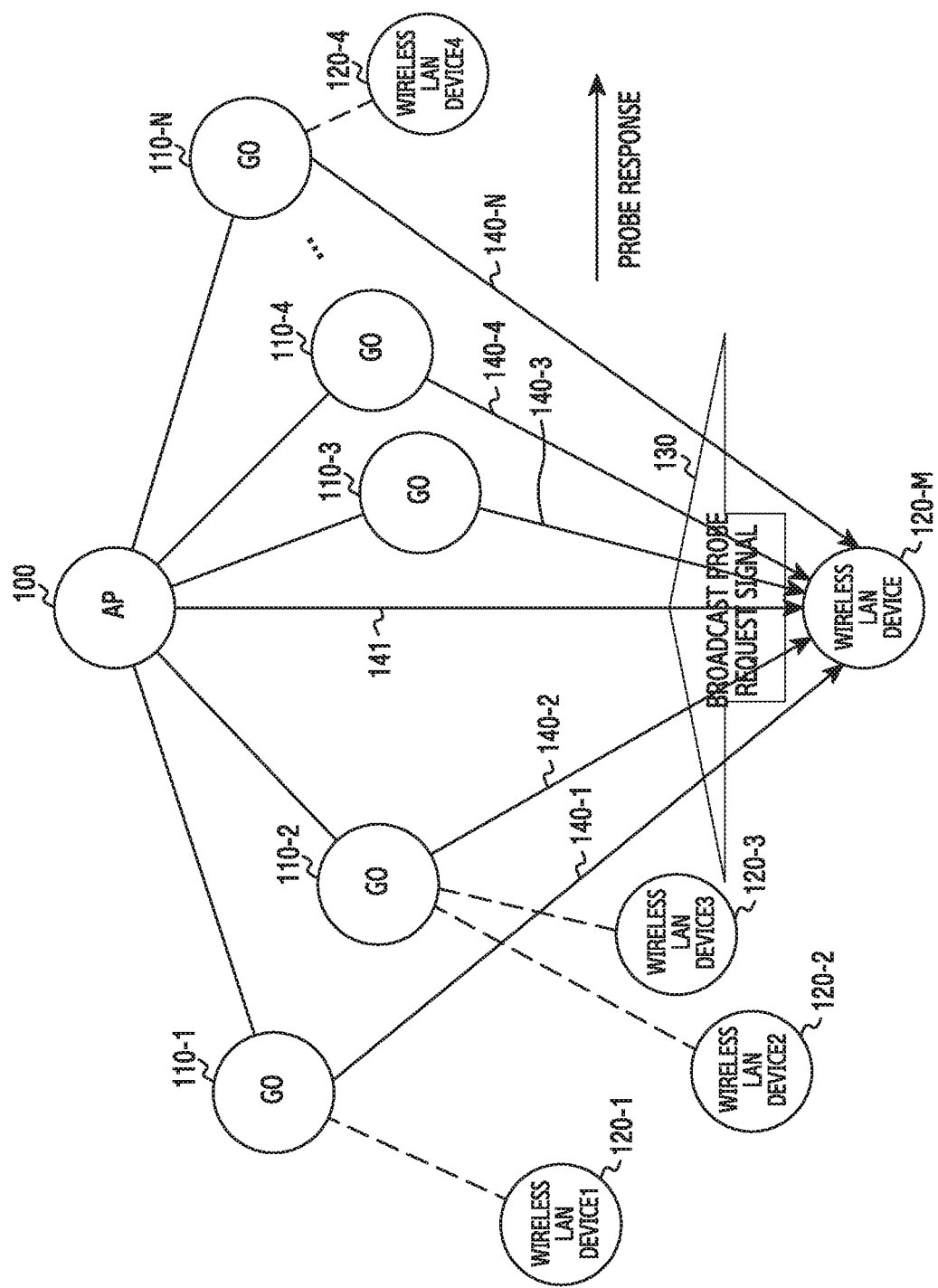
FIG. 1 is a view illustrating a configuration of a WLAN system transmitting and receiving a probe request signal and a probe response signal according to the prior art.

Hereinafter, a preferable example embodiment of the present invention will be described with reference to the accompanying drawings. Further, in the following description of the present invention, a detailed description of known functions or configurations incorporated herein will be omitted when it may make the subject matter of the present invention rather unclear. Further, terms described later are defined in consideration of functions of the present invention, but may vary according to the intention or convention of a user or operator. Therefore, the definition should be made based on the overall contents of the present specification.

As used in various embodiments of the present invention, the expressions "include", "may include", and other conjugates refer to the existence of a corresponding disclosed function, operation, or constituent element, and do not limit one or more additional functions, operations, or constituent elements. Further, as used in various embodiments of the present invention, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

In various embodiments of the present invention, the expression "or" or "at least one of A or/and B" includes any or all of combinations of words listed together. For example, the expression "A or B" or "at least A or/and B" may include A, may include B, or may include both A and B.

While expressions including ordinal numbers, such as "first" and "second", as used in various embodiments of the present invention may modify various constituent elements, such constituent elements are not limited by the above expressions. For example, the above expressions do not limit the sequence and/or importance of the elements. The above-described expressions may be used to distinguish an element from another element. For example, a first user device and a second user device indicate different user devices although both of them are user devices. For example, a first element may be termed a second element, and likewise a second element may also be termed a first element without departing from the scope of various embodiments of the present invention.

It should be noted that if it is described that one component element is "coupled" or "connected" to another component element, the first component element may be directly coupled or connected to the second component, and a third component element may be "coupled" or "connected" between the first and second component elements. Contrarily, when an element is "directly coupled" or "directly connected" to another element, it may be construed that a third element does not exist between the first element and the second element.

The terms as used in various embodiments of the present invention are merely for the purpose of describing particular embodiments and are not intended to limit the various embodiments of the present invention. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present invention pertain. Such terms as those defined in a generally used dictionary are to be interpreted to have the meanings equal to the contextual meanings in the relevant field of art, and are not to be interpreted to have ideal or excessively formal meanings unless clearly defined in the present invention.

Hereinafter, a method of selectively transmitting a probe response signal (or message) from a device will be described. Hereinafter, a device may be WLAN devices (or WLAN electronic devices) supporting a WLAN communication function. For example, the device may include at least one of a WLAN Access Point (AP), a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a speaker, a camera, a wearable device, an electronic clock, a watch, a refrigerator, an air conditioner, a vacuum cleaner, an artificial intelligent robot, a TV, a Digital Video Disk (DVD) player, a stereo system, an oven, a microwave, a washing machine, an air cleaner, a medical device (e.g., a Magnetic Resonance Angiography (MRA), a Magnetic Resonance Imaging (MRI), a Computerized Tomography (CT), a photographer, an ultrasonic device), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a vehicle infotainment device, an electronic equipment for a ship, an avionics, a security device, a camcorder, and a game console. Hereinafter, it is obvious that the device is not limited to the above-mentioned devices to a person having an ordinary skill in the art. Hereinafter, the "device" and the "WLAN device" means a WLAN electronic device supporting a WLAN communication function, and the device and the WLAN device are not interpreted as different devices. But, hereinafter, the "device" and the "WLAN device" may be interpreted as devices performing different operations according to whether the device or the WLAN device is a device transmitting a probe request signal or a device transmitting a probe response signal.

Figure 2A:
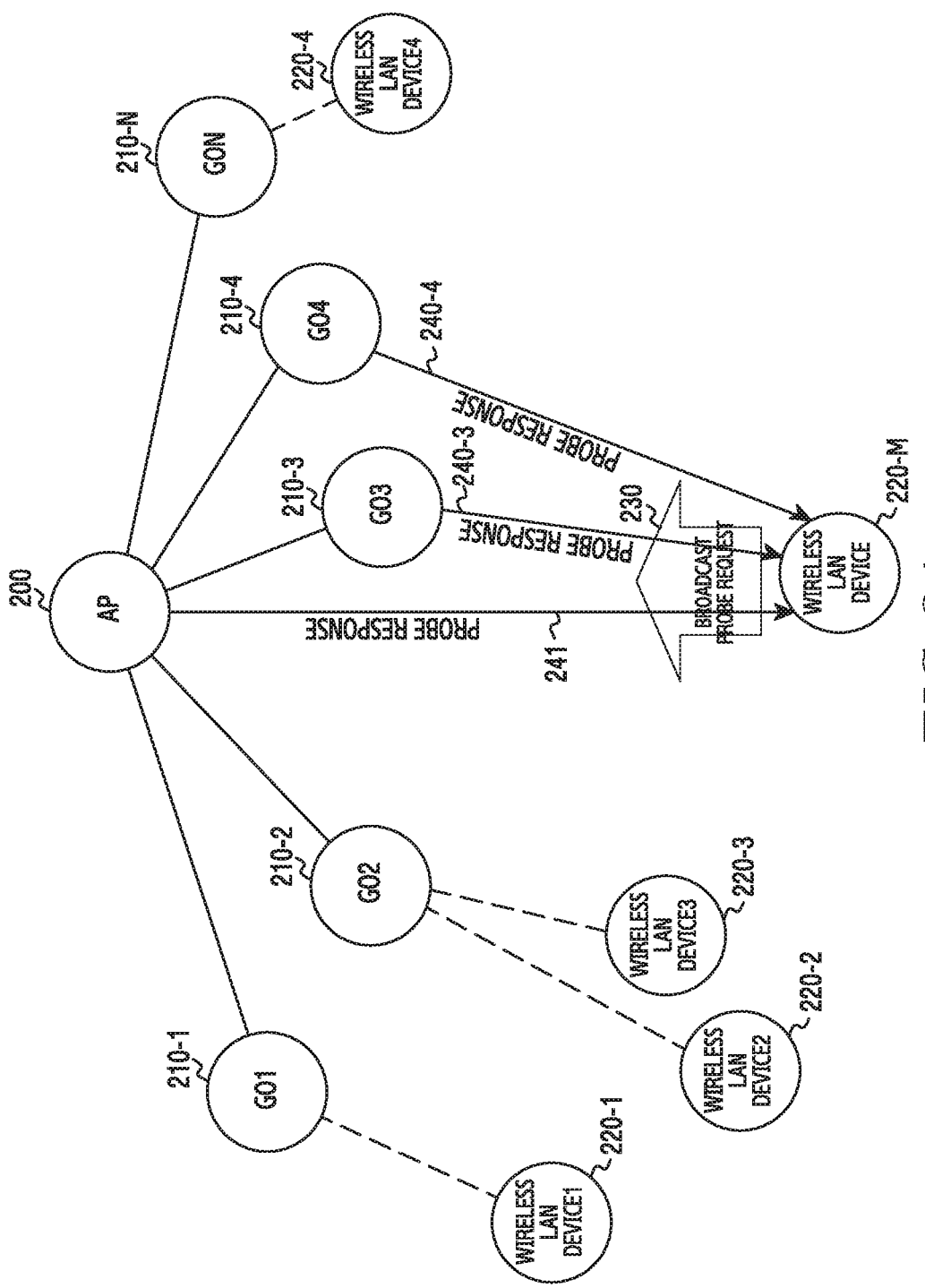
FIG. 2A is a view illustrating a configuration of a WLAN system transmitting and receiving a probe request signal and a probe response signal according to an embodiment of the present invention.

FIG. 2A illustrates a configuration of a WLAN system transmitting and receiving a probe request signal and a probe response signal according to an embodiment of the present invention.

Referring to FIG. 2A, in the WLAN system according to an embodiment of the present invention, one network may include at least one Access Point (AP) 200, a plurality of Group Owners (GOs) 210-1 to 210-N, and a plurality of WLAN devices 220-1 to 220-M. The GOs 210-1 to 210-N means user devices performing a WLAN AP role (or bridge function) for at least another device, to form a communication group with at least another device, that is, a WLAN device, according to a user configuration. The GOs 210-1 to 210-N may perform a function of a relay a communication between the AP 200 and the WLAN device.

Referring to FIG. 2A, a WLAN device M 220-M periodically broadcasts 230 a probe request message, in order to search for the AP 200 or GOs 210-1 to 210-N around the WLAN device M 220-M. According to an embodiment, the probe request message broadcasted from the WLAN device M 220-M may include identification information of the WLAN device M 220-M, address information (e.g., a Medium Access Control (MAC) address, or an Internet Protocol (IP) address) of the WLAN device M 220-M, a type of the WLAN device M 220-M, vender information (e.g., a manufacturer information), authentication information, requested service quality information (e.g., a data transmission rate) and addition information.

The AP 200 and/or GOs 210-1 to 210-N around the WLAN device M 220-M may receive the probe request message. According to an embodiment of the present invention, the AP 200 and/or GOs 210-1 to 210-N selectively respond in response to the probe request message. For example, the AP 200, a Go 3 210-3 and a GO 210-4 may transmit 241, 240-3 and 240-4 a probe response message in response to the probe request message, and a GO 1 210-1, a GO 2 210-2 and a GO N 210-N may not transmit a response message in response to the probe request message. That is, the AP 200 and/or GOs 210-1 to 210-N according to an embodiment of the present invention determines whether the AP 200 and/or GOs 210-1 to 210-N transmit the response message in response to a corresponding probe request message using information included in the probe request message or information thereof. For example, each of the AP 200 and/or GOs 210-1 to 210-N may determine whether the AP 200 and/or GOs 210-1 to 210-N transmit the response message in response to the probe request message based on at least one of a pre-stored list, identification information of the WLAN device transmitting the probe request message, address information of the WLAN device transmitting the probe request message, a type of the WLAN device transmitting the probe request message, service quality information (e.g., data transmission rate) requested by the WLAN device transmitting the probe request message, vender information, authentication information, another additional information included in the probe request message, status information thereof, and information on providable data transmission rate.

As described above, in the present invention, the AP 200 and/or GOs 210-1 to 210-N receiving the probe request message selectively transmit the probe response message, and thus transmitting the probe response message unnecessarily may be prevented. Accordingly, resource efficiency may be improved and interference may be reduced.

FIG. 2A is described under an assumption of a situation in which WLAN devices operated as at least one AP 200 and the plurality of GOs 210-1 to 210-N are together included in the WLAN system. However, embodiments of the present invention may be applied to a situation in which at least one AP exists without a GO as shown in FIG. 2B in the same manner.

Figure 2B:
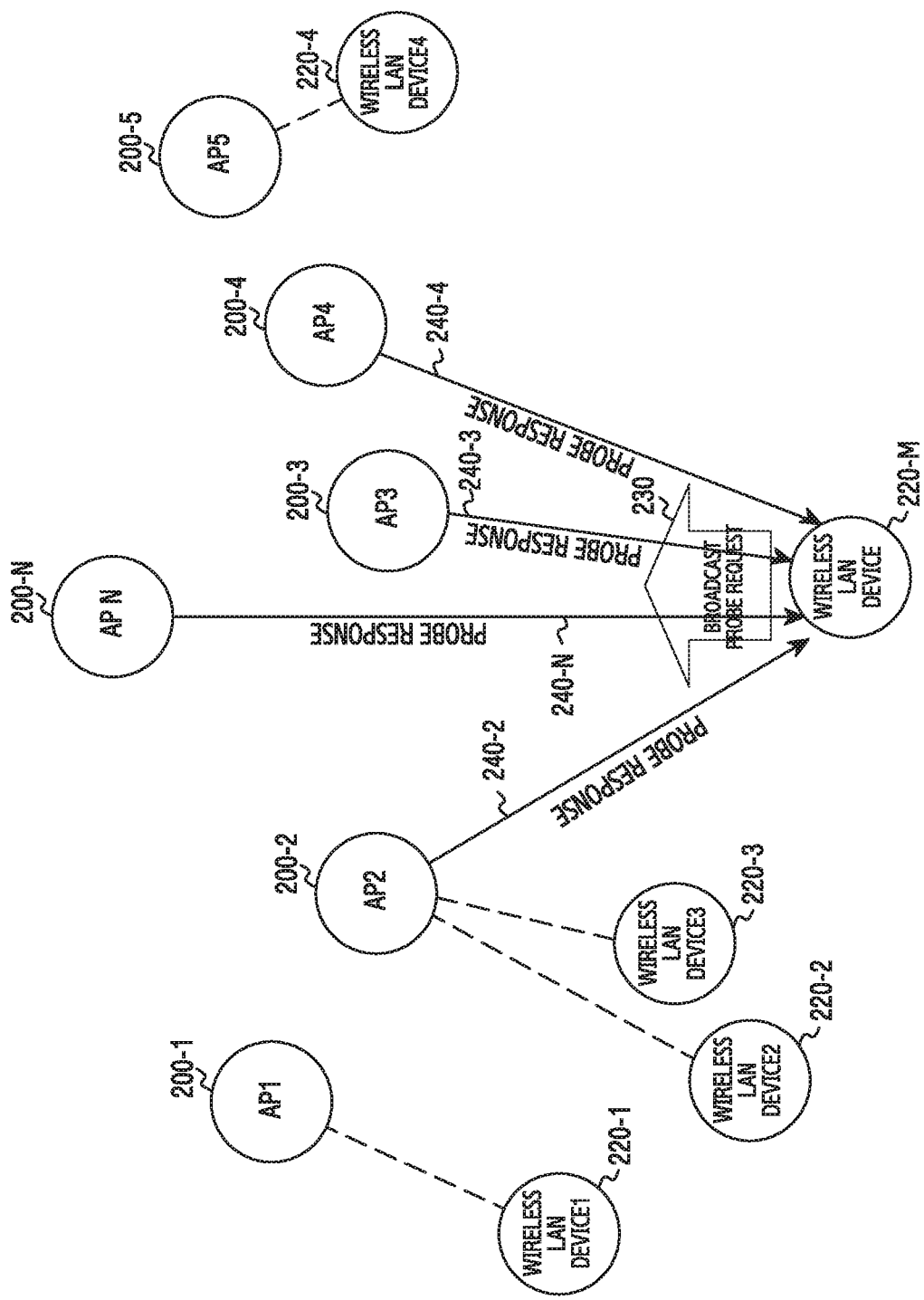
FIG. 2B is a view illustrating a configuration of a WLAN system transmitting and receiving a probe request signal and a probe response signal according to another embodiment of the present invention.

FIG. 2B illustrates a configuration of a WLAN system transmitting and receiving a probe request signal and a probe response signal according to another embodiment of the present invention.

Referring to FIG. 2B, in the WLAN system according to an embodiment of the present invention, one network may include at least one Access Point (AP) 200, and a plurality of WLAN devices 220-1 to 220-M.

Referring to FIG. 2B, a WLAN device M 220-M periodically broadcasts 230 a probe request message, in order to search for at least one AP around the WLAN device M 220-M. Therefore, the APs 200-1 to 200-N around the WLAN device M 220-M may receive the probe request message. According to an embodiment of the present invention, the APs 200-1 to 200-N selectively respond in response to the probe request message. For example, an AP2 200-2, an AP3 200-3, an AP4 200-4 and an APN 200-N may transmit 240-2, 240-3, 240-4 and 240-N, and an AP1 200-1 and an AP5 200-5 may not transmit a response message in response to the probe request message. That is, the APs 200-1 to 200-N according to an embodiment of the present invention determines whether the APs 200-1 to 200-N transmit the response message in response to a corresponding probe request message using information included in the probe request message or information thereof. For example, each of the APs 200-1 to 200-N may determine whether the APs 200-1 to 200-N transmit the response message in response to the probe request message based on at least one of a pre-stored list, identification information of the WLAN device transmitting the probe request message, address information of the WLAN device transmitting the probe request message, a type of the WLAN device transmitting the probe request message, service quality information (e.g., data transmission rate) requested by the WLAN device transmitting the probe request message, vender information, authentication information, additional information included in the probe request message, status information thereof, and information on providable data transmission rate. As described above, in the present invention, the APs 200-1 to 200-N receiving the probe request message selectively transmit the probe response message, and thus transmitting the probe response message unnecessarily may be prevented. Accordingly, resource efficiency may be improved and interference may be reduced.

Figure 3:
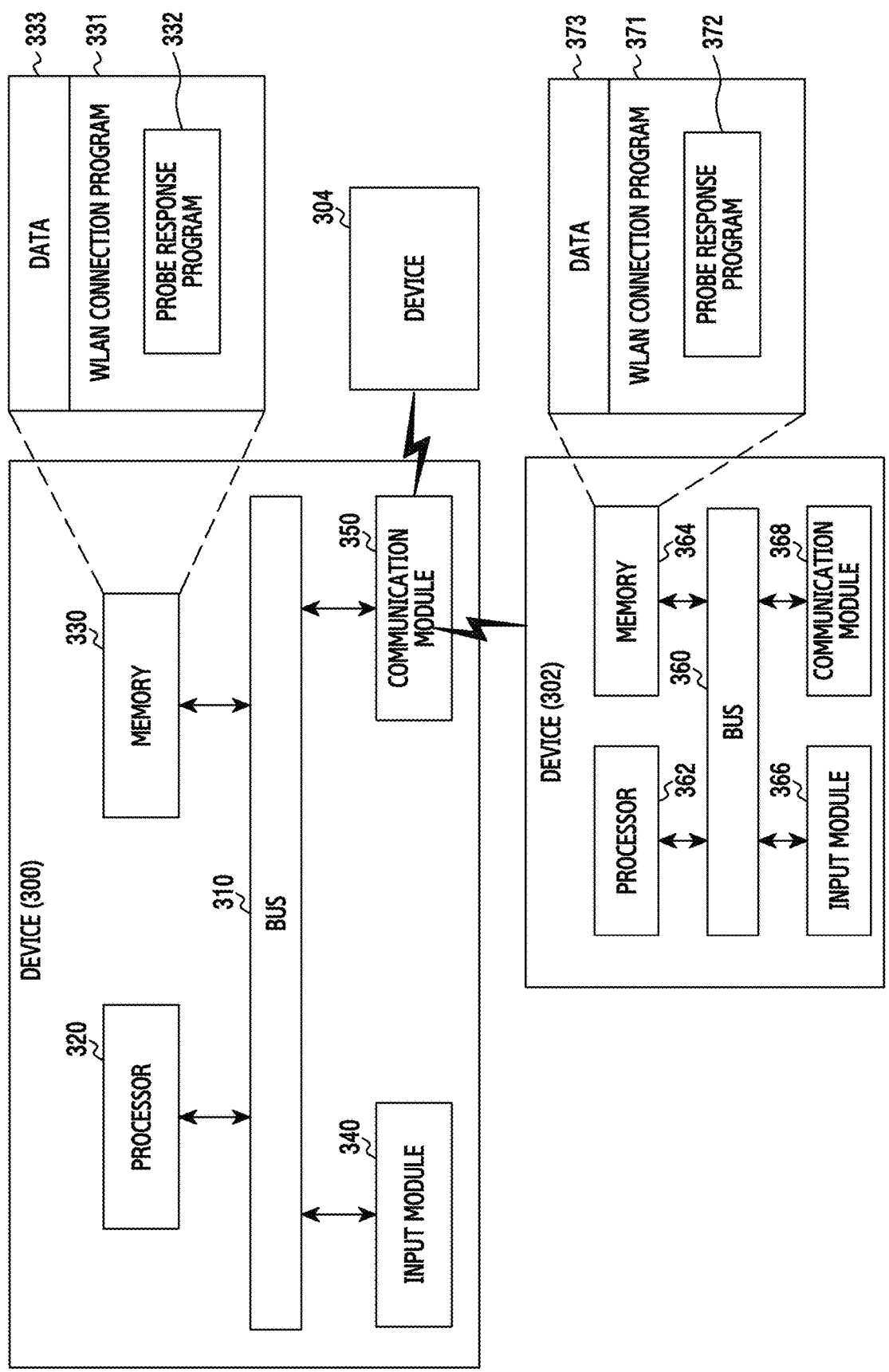
FIG. 3 is a view illustrating a block configuration of a device according to an embodiment of the present invention.

FIG. 3 illustrates a block configuration of a device according to an embodiment of the present invention. Here, the device 300 may be an AP, or a WLAN device operated as a GO.

Referring to FIG. 3, a device 300 includes elements such as a bus 310, a processor 320, a memory 330, an input module 340 and a communication module 350.

The bus 310 connects the elements included in the device 300, and performs a function of transferring a communication between the elements.

The processor 320 control various functions related to an operation of the device 300. For example, the processor 320 may decode a command received from at least another element included in the device 300 through the bus 310, and may execute an operation or a data process according to the decoded command.

The processor 320 executes at least one program stored in the memory 330 to control a function for providing various services. For example, the processor 320 executes a WLAN connection program 331 stored in the memory 330 to provide a bridge function for WLAN devices that attempt to perform a communication through a WLAN. In addition, according to an embodiment of the present invention, the processor 320 executes the WLAN connection program 331 to provide a function for selectively responding in response to a probe request message received from the WLAN devices.

The memory 330 stores a command or data 333 received from at least one element included in the device 300 or generated by at least one element. For example, the memory 330 may store at least one of a WLAN connection admission device list, a WLAN connection admission device type, authentication information for the WLAN connection, addition information for the WLAN connection, address information (e.g., MAC address and IP address) of the WLAN connection admission device, WLAN connection admission vendor information, WLAN connection history information indicating WLAN device that has been connected to the device 300 through the WLAN; and a providable data transmission rate. The providable data transmission rate may be dynamically changed according to the number of terminals connected to the device 300, and a data transmission rate used by the terminals connected to the device 300.

The memory 330 may include a WLAN connection program 331 module. The WLAN connection program 331 module may be configured by at least one of software, a firmware and hardware.

Figure 4:
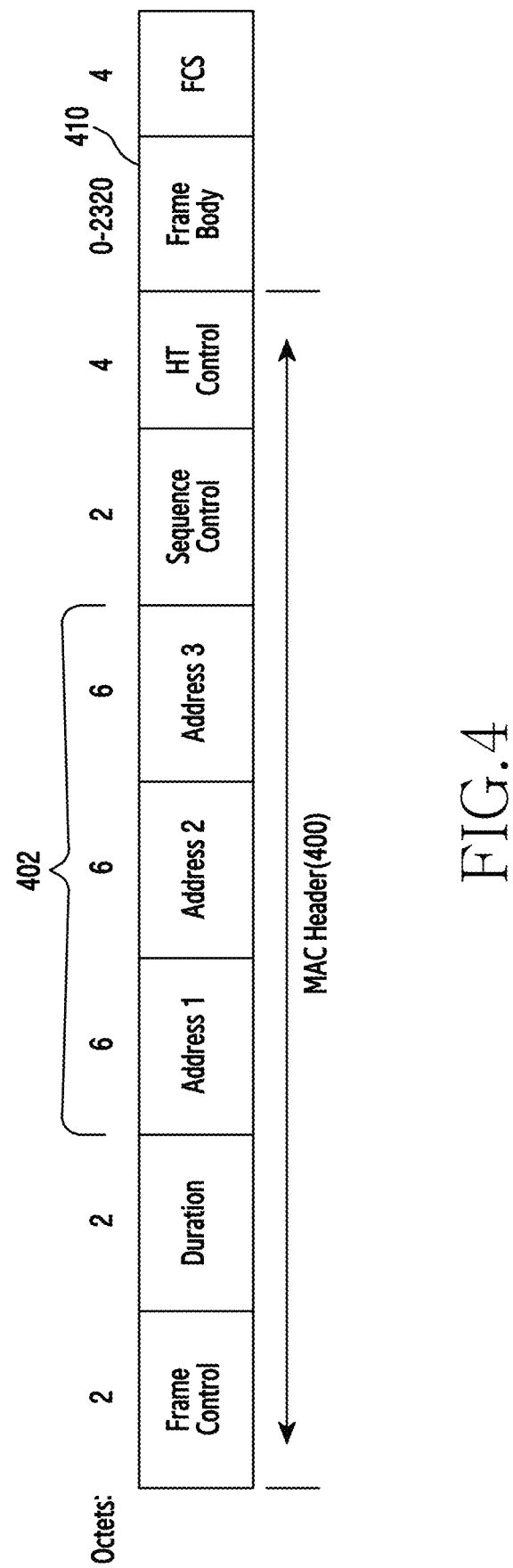
FIG. 4 is a view illustrating a frame structure of the probe request signal according to an embodiment of the present invention.

The WLAN connection program 331 may include commands for providing a bridge function for the WLAN devices which attempt to perform the communication through the WLAN. The WLAN connection program 331 according to an embodiment of the present invention includes a probe response program 332, and thus may include commands for selectively responding in response to the probe request based on at least one of information included in the probe request message, information recorded in the device 300, status information of the device 300, and providable data transmission rate information of the device 300. Here, the information included in the probe request message includes information added to addresses 402 (Address1, Address2 and Address3) included in a MAC header 400 and/or a vender specific information element field included in a frame body 410, in the probe request message having a frame structure as shown in FIG. 4. In addition, the information recorded in the device 300 includes at least one of the WLAN connection admission device list, the WLAN connection admission device type, the authentication information for the WLAN connection, the address information (e.g., MAC address and IP address) of the WLAN connection admission device, the WLAN connection admission vendor information, and the WLAN connection history information which are stored in the memory 330. In addition, the status information of the device 300 means information indicating whether the device 300 is operated as a pairing host mode or a normal mode. The pairing host mode is a mode in which the device 300 performs an operation of configuring a connection for a WLAN communication. The device 300 that is operated as the pairing host mode may form a connection with a new WLAN device by admitting the connection with the new WLAN device. The normal mode is a mode in which the device 300 performs an operation of transmitting and receiving data to and from a WLAN device of which a WLAN connection is previously formed. The device 300 that is operated as the normal mode may not admit a connection of a new WLAN connection, and may admit a connection of a WLAN device having an existing connection history.

According to an embodiment of the present invention, a probe response program 332 may include a command that obtains identification information of a corresponding WLAN device from the probe request message received from the WLAN device, determines whether the obtained identification information is registered in the device list which is previously stored in the memory 330, and determines whether the probe response message is to be transmitted to the corresponding WLAN device based on a determination result. According to an embodiment of the present invention, the probe response program 332 may include a command which obtains address information of a corresponding WLAN device from the probe request message received from the WLAN device, determines whether the obtained address information corresponds to the address information of the WLAN connection admission device, which is previously stored in the memory 330, and determines whether the probe response message is to be transmitted to the corresponding WLAN device based on a determination result. According to another further embodiment of the present invention, the probe response program 332 may include a command which determines whether the probe response message is to be transmitted to a corresponding WLAN device based on the status of the device and the connection history information for the WLAN device when the probe request message is received from the WLAN device. According to another further embodiment of the present invention, the probe response program 332 may include a command that obtains device type information of a corresponding WLAN device from the probe request message received from the WLAN device, determines whether the obtained device type information corresponds to the previously configured WLAN connection admission device type, and determines whether the probe response message is to be transmitted to the corresponding WLAN device based on a determination result. According to another further embodiment of the present invention, the probe response program 332 may include a command which obtains vendor information of a corresponding WLAN device from the probe request message received from the WLAN device, determines whether the obtained vendor information corresponds to the previously configured WLAN connection admission vendor information, and determines whether the probe response message is to be transmitted to the corresponding WLAN device based on a determination result. According to another further embodiment of the present invention, the probe response program 332 may include a command that obtains information on a data transmission rate requested by a corresponding WLAN device from the probe request message received from the WLAN device, determines whether the data transmission rate requested by the corresponding WLAN device may be secured based on a data transmission rate providable by the device 300, and determines whether the probe response message is to be transmitted to the corresponding WLAN device according to whether the data transmission rate requested by the corresponding WLAN device may be secured. According to another further embodiment of the present invention, the probe response program 332 may include a command that obtains the authentication information from the probe request message received from the WLAN device, determines whether the obtained additional information is equal to previously configured WLAN connection authentication information, and determines whether the probe response message is to be transmitted to the corresponding WLAN device based on a determination result. In addition, the probe response program 332 may include a command that adds a corresponding WLAN device transmitting the probe request message, including the authentication information equal to the previously configured authentication information to the device list, and determines whether the response message is to be transmitted in response to the probe request using the device list. Here, the above-mentioned embodiments for determining whether the response message is to be transmitted will be described with reference to FIGS. 6 to 10 in detail.

The input module 340 transfers a command or data generated by a user selection or a gesture to the processor 320 or the memory 330 through the bus 310. The input module 340 may include at least one of a physical key button, a physical keypad, a touch sensing sensor, a proximity sensor, an acceleration sensor, a microphone, and a mouse. The input module 340 according to an embodiment of the present invention may receive a command or data for a mode exchange of the device 300. For example, the input module 340 may receive a key exchanging the status of the device 300 which is performed as the normal mode as the pairing host mode.

The communication module 350 performs a WLAN communication connection between the device 300 and at least one or more other devices 302 and 304. For example, the communication module 350 may support a near field communication protocol (e.g., a Wi-Fi (Wireless Fidelity), a BlueTooth (BT), and a Near Field Communication (NFC). In addition, the communication module 350 may support a network communication (e.g., Internet, a Local Area Network (LAN), a Wire Area Network (WAN), a telecommunication network, a cellular network, a satellite network, a Plain Old Telephone Service (POTS), or the like). The communication module 350 may form a group by communicating with at least one or more other devices 302 and 304 positioned within a critical distance from the device 300. For example, the communication module 350 may provide a mobile Access Point (AP) function for generating a group that performs a communication using a WLAN.

The device 302 or 304 may be a device having a type equal to that of the device 300 or may be a device having a type different from that of the device 300. According to an embodiment of the present invention, the device 302 may be a WLAN device broadcasting a probe request message in order to search for an AP or a GO around thereof.

The device according to an embodiment of the present invention may include elements such as a bus 360, a processor 362, a memory 364, an input module 366 and a communication module 368.

The bus 360 connects the elements included in the device 302, and performs a function of transferring a communication between the elements.

The processor 362 controls various functions related to an operation of the device 302. For example, the processor 362 may decode a command received from at least another element included in the device 302 through the bus 360, and may execute an operation or a data process according to the decoded command.

The processor 362 executes at least one program stored in the memory 364 to control a function for providing various services. For example, the processor 362 executes a WLAN connection program 371 stored in the memory 364 to search for the AP and/or the GO and performs the WLAN connection through the searched AP and/or GO. In addition, according to an embodiment of the present invention, the processor 362 executes the WLAN connection program 371 to control a function for broadcasting the probe request message for searching for the AP and/or GO.

The memory 364 stores a command or data 373 received from at least one element included in the device 302 or generated by at least one element. For example, the memory 364 may store at least one of identification information of the device 302, a device type of the device 302, authentication information on the WLAN connection, addition information on the WLAN connection, address information (e.g., MAC address and IP address) of the device 302, vendor information, request data transmission rate information on each application executable by the device 302, and request data transmission rate information on each service executable by the device 302.

The memory 364 may include a WLAN connection program 371 module. The WLAN connection program 371 module may be configured by at least one of software, a firmware, and hardware.

The WLAN connection program 371 may include commands for broadcasting the probe request message. The WLAN connection program 371 according to an embodiment of the present invention includes a probe response program 372, and thus may include commands for generating and broadcasting the probe request message. The WLAN connection program 371 may include commands for configuring the probe request message having a frame structure as shown in FIG. 4. The WLAN connection program 371 may include commands including additional information in addresses 402 (Address1, Address2, and Address3) included in the MAC header 400 and/or a vendor specific information element field included in the frame body 410, in the frame structure as shown in FIG. 4. According to an embodiment, the WLAN connection program 371 may include a command for including at least one of the identification information of the device 302, the device type of the device 302, the authentication information on the WLAN connection, the addition information on the WLAN connection, the address information (e.g., MAC address and IP address) of the device 302, and the vendor information, which are stored in the memory 364, in the vendor specific information element field of the probe request message. In addition, the WLAN connection program 371 may include a command for including at least one application executed in the device 302, at least one application of which an execution is requested by the device 302, and/or a request data transmission rate for at least one service of which an execution is requested by the device 302, in the vendor specific information element field of the probe request message. For example, the WLAN connection program 371 may include a command that identifies a request data transmission rate of at least one application requiring the WLAN connection among applications of which executions are detected according to a user or a previously configured method in the device 302, and configures a probe request message including the identified request data transmission rate.

The input module 366 transfers a command or data generated by a user selection or a gesture to the processor 362 or the memory 364 through the bus 360. The input module 366 may include at least one of a physical key button, a physical keypad, a touch sensing sensor, a proximity sensor, an acceleration sensor, a microphone, and a mouse. The input module 366 according to an embodiment of the present invention may receive a command or data for executing at least one application. The input module 366 according to an embodiment of the present invention may receive a command or data for providing at least one service function.

The communication module 368 performs a WLAN communication connection between the device 302 and at least another device 300. For example, the communication module 368 may support a near field communication protocol (e.g., a Wi-Fi (Wireless Fidelity), a BlueTooth (BT), and a Near Field Communication (NFC). In addition, the communication module 368 may support a network communication (e.g., Internet, a Local Area Network (LAN), a Wire Area Network (WAN), a telecommunication network, a cellular network, a satellite network, a Plain Old Telephone Service (POTS), or the like). The communication module 368 may search for at least one device 300 positioned within a critical distance from the device 302 to perform the WLAN connection.

According to an embodiment, the device 302 may include a communication module communicating with at least another device, and a control unit that controls to sense a WLAN connection event by an execution of at least one application, and to broadcast the probe request message for the WLAN connection. At this time, the probe request message may include at least one of the address information of the device, the type information of the device, the authentication information of the device, the vendor information of the device, the request data transmission rate of the device, and the algorithm operation information of the device.

Figure 5A:
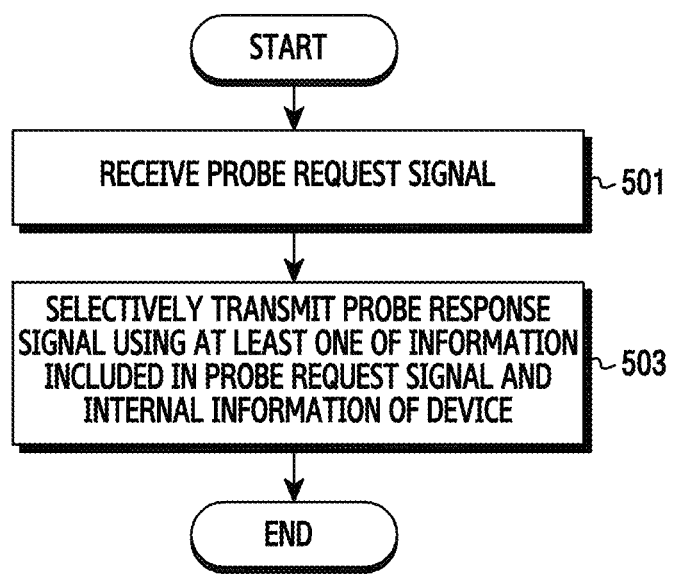
FIG. 5A is a view illustrating an operation procedure of a device according to an embodiment of the present invention.

FIG. 5A illustrates an operation procedure of the device 300 according to an embodiment of the present invention.

Referring to FIG. 5A, in step 501, the device 300 receives the probe request message from at least another WLAN device. The probe request message may be configured as shown in FIG. 4.

In step 503, the device 300 selectively transmits the probe response signal using at least one of information included in the probe request signal and internal information of the device 300. For example, the device 300 determines whether the device 300 transmits the probe response signal using at least one among the information included in the probe request signal, the internal information of the device 300, and providable data transmission rate information of the device 300, and transmits the probe response signal when the probe response signal transmission is determined. Here, the information included in the probe request message may include information added in the address 402 included in the MAC header 400 and/or the vendor specific information element field included in the frame body 410, in the probe request message having the frame structure as shown in FIG. 4. In addition, the internal information of the device 300 may include at least one of a WLAN admission device related information and the status information of the device 300, which are recorded in the device 300. For example, the WLAN admission device related information recorded in the device 300 may include at least one of the WLAN connection admission device list, the WLAN connection admission device type, the authentication information on the WLAN connection, the address information of the WLAN connection admission device, the WLAN admission vendor information, and the WLAN connection history information, stored in the memory 330. In addition, the status information of the device 300 means the information indicating whether the device 300 is operated as the pairing host mode or the normal mode. The providable data transmission rate information of the device 300 may be determined based on information on a cell load such as the number of terminals connected (or accessed) to the device 300, and a data transmission rate of the terminal connected to the device 300.

Next, the device 300 ends the procedure according to an embodiment of the present invention.

Figure 5B:
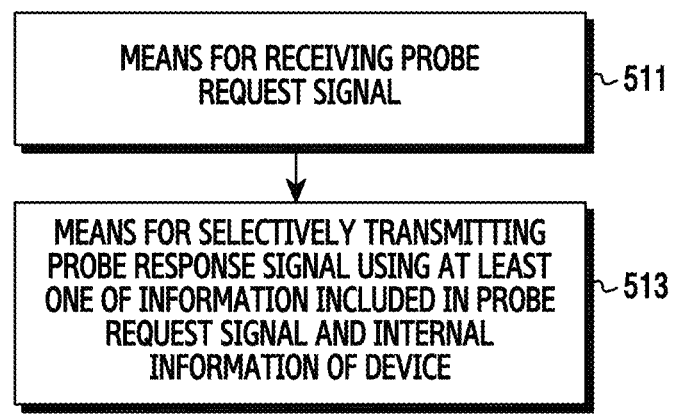
FIG. 5B is a view illustrating a means of a device according to an embodiment of the present invention.

FIG. 5B illustrates a means of a device according to an embodiment of the present invention.

Referring to FIG. 5B, the device 300 includes a means 511 receiving the probe request message from at least another WLAN device. For example, the device 300 includes the communication module 350 supporting the WLAN communication in order to receive the probe request message. The probe request message may be configured as shown in FIG. 4.

In addition, the device 300 includes a means 513 selectively transmitting the probe response signal using at least one of the information included in the probe request signal and the internal information of the device 300. For example, the device 300 may include the processor 320 or the probe response program 332 which determines whether the device responds in response to the probe request signal using at least one of the information included in the probe request signal, the internal information of the device 300, and the providable data transmission rate information of the device 300. In addition, the device 300 may include the memory 330 recording the internal information of the device 300.

Figure 6:
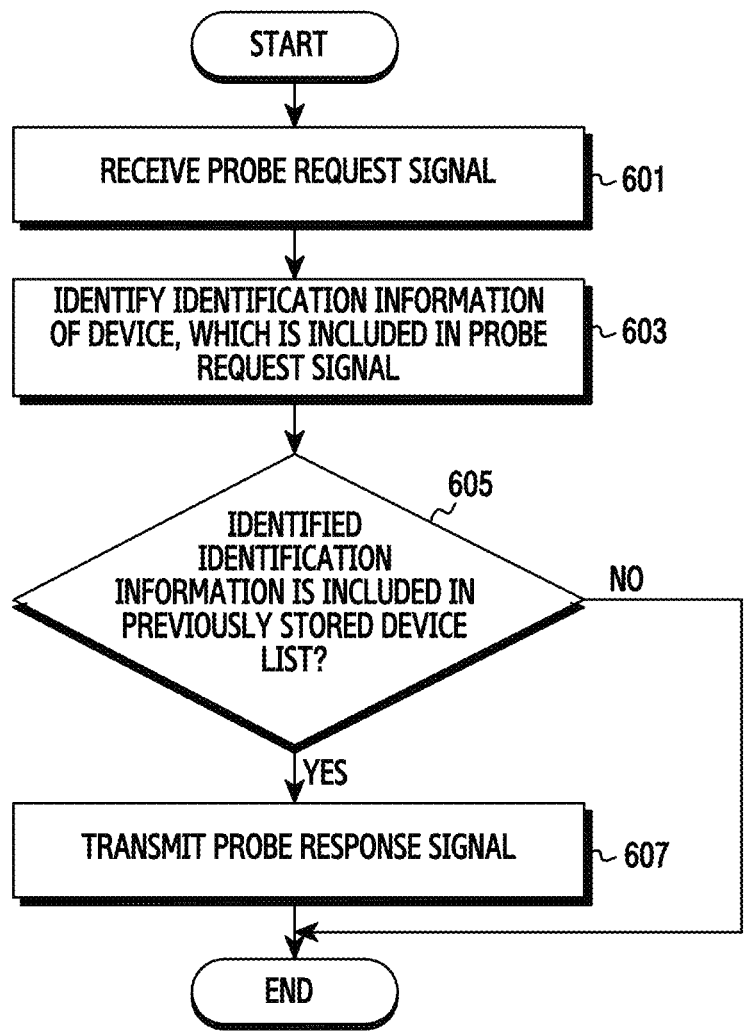
FIG. 6 is a view illustrating an operation procedure for selectively transmitting the probe response signal based on a device list from a device according to an embodiment of the present invention.

FIG. 6 illustrates an operation procedure for selectively transmitting the probe response signal based on a device list from a device according to an embodiment of the present invention.

Referring to FIG. 6, in step 601, the device 300 receives the probe request signal. In step 603, the device 300 identifies identification information of the device, which is included in the probe request signal. For example, the identification information of the device may include at least one of an ID, a MAC address, and an IP address of the device.

In step 605, the device 300 checks whether the identification information of the WLAN device transmitting the probe request signal is included in a previously stored device list. The previously stored device list may include identification information of WLAN devices admitting the WLAN connection in the device 300. The previously stored device list may be generated by processing information collected from the device 300, may be received from another device, and may be generated based on information input by a user.

When it is determined that the identification information of the WLAN device transmitting the probe request signal is included in the previously stored device list, in step 607, the device 300 transmits the probe response signal to the WLAN device transmitting the probe request signal, and ends the procedure according to an embodiment of the present invention.

In contrast, when it is determined that the identification information of the WLAN device transmitting the probe request signal is not included in the previously stored device list, the device 300 determines that the WLAN device transmitting the probe request signal is a device to which the WLAN connection is not admitted, does not transmit the probe response signal, and ends the procedure according to an embodiment of the present invention.

In FIG. 6 described above, a method in which the device 300 transmits the probe response signal to only WLAN devices of which identification information is included in the device list, by using the device list including the identification information of the WLAN devices to which the WLAN connection is admitted is described. However, according to an embodiment, a method in which the device 300 transmits the probe response signal to only WLAN devices of which identification information is not included in the device list, by previously storing a device list including the identification information of the WLAN devices to which the WLAN connection is not admitted, may be possible.

Figure 7:
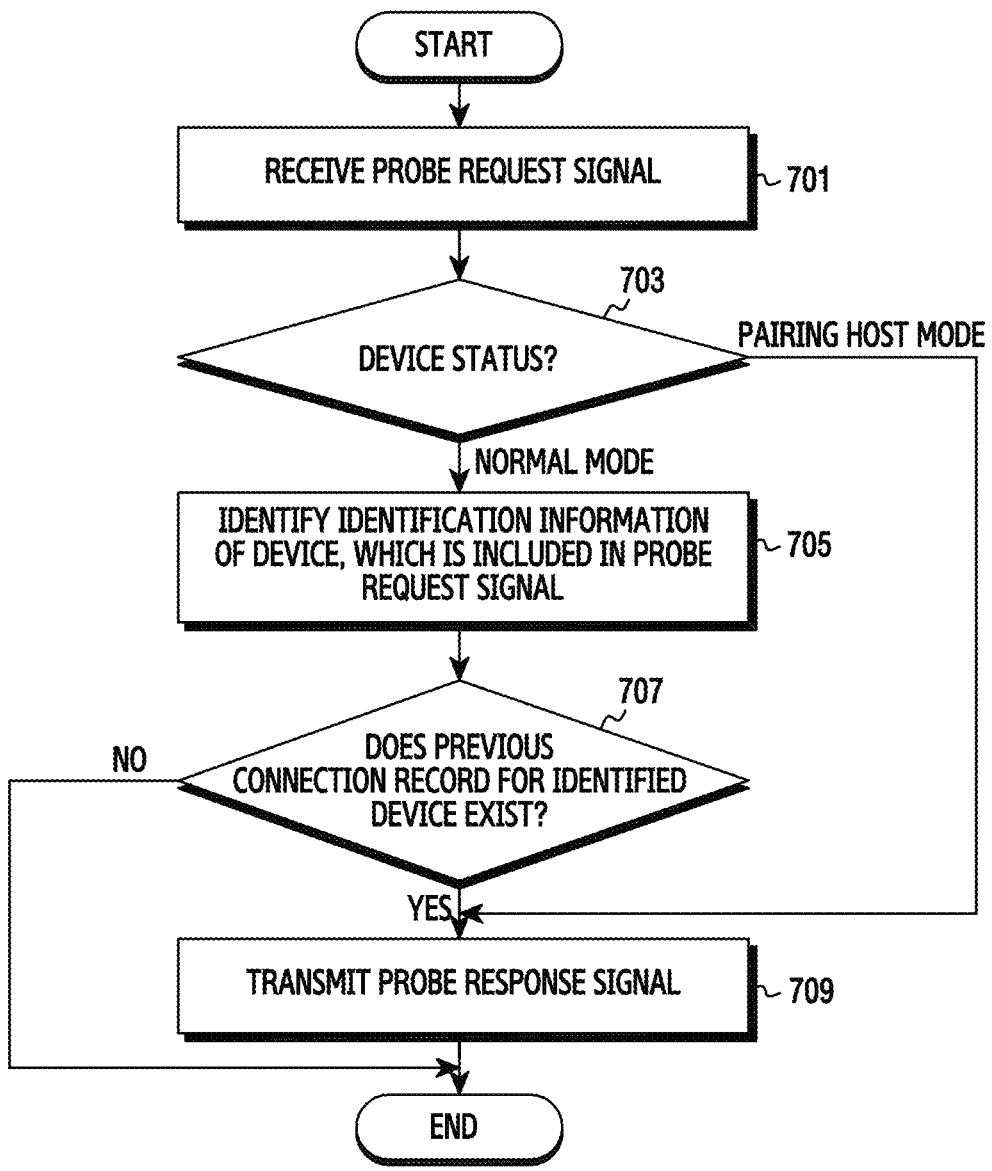
FIG. 7 is a view illustrating an operation procedure for selectively transmitting the probe response signal based on a device status from a device according to an embodiment of the present invention.

FIG. 7 illustrates an operation procedure for selectively transmitting the probe response signal based on a device status from a device according to an embodiment of the present invention.

Referring to FIG. 7, in step 701, the device 300 receives the probe request signal. In step 703, the device 300 identifies the status information thereof. For example, the device 300 identifies whether the device 300 is operated as the pairing host mode that admits the connection with a new WLAN device or the device is operated as the normal mode, which does not admit the connection with a new WLAN device. The device 300 may be operated as the pairing host mode for a previously configured time duration when the device 300 is changed from a power off state to a power on state, when the device 300 is reset, when a previously configured mode exchange key is input, or a mode exchange request command is received by a user, and the device 300 may be operated as the normal mode for other time duration.

As a result of the identification of step 703, when the device 300 is operated as the pairing host mode, in step 607, the device 300 transmits the probe response signal to the WLAN device transmitting the probe request signal, and ends the procedure according to an embodiment of the present invention.

As a result of the identification of step 703, when the device 300 is operated as the normal mode, in step 705, the device 300 identifies the identification information of the device, which is included in the probe request signal. For example, the identification information of the device may include at least one of the device ID, the MAC address and the IP address.

Next, in step 707, the device 300 checks whether a previous connection record for a corresponding WLAN device exists, based on the identified identification information of the device.

When there is not the previous connection record for the WLAN device transmitting the probe request signal, the device 300 determines that the WLAN device transmitting the probe request signal is a new WLAN device. Since the device 300 is currently operated as the normal mode which does not admit the connection with a new WLAN device, the device 300 does not transmit the probe response signal, and ends the procedure according to an embodiment of the present invention.

In contrast, there is the previous connection record for the WLAN device transmitting the probe request signal, in step 709, the device 300 determines that the WLAN device transmitting the probe request signal is a WLAN device that had been connected in the past, and transmits the probe response signal to the corresponding WLAN device. For example, the device 300 may determine that the connection of the WLAN device connected to the device 300 is released for a reason, such as a movement of the WLAN device, and the WLAN device transmits the probe request signal to be connected to the device 300 again, and the device 300 may transmit the probe response message in order to admit the connection of the corresponding WLAN device. In this case, the device 300 should store WLAN connection history information indicating WLAN devices that had been connected to the device 300.

Next, the device 300 ends the procedure according to an embodiment of the present invention.

Figure 8:
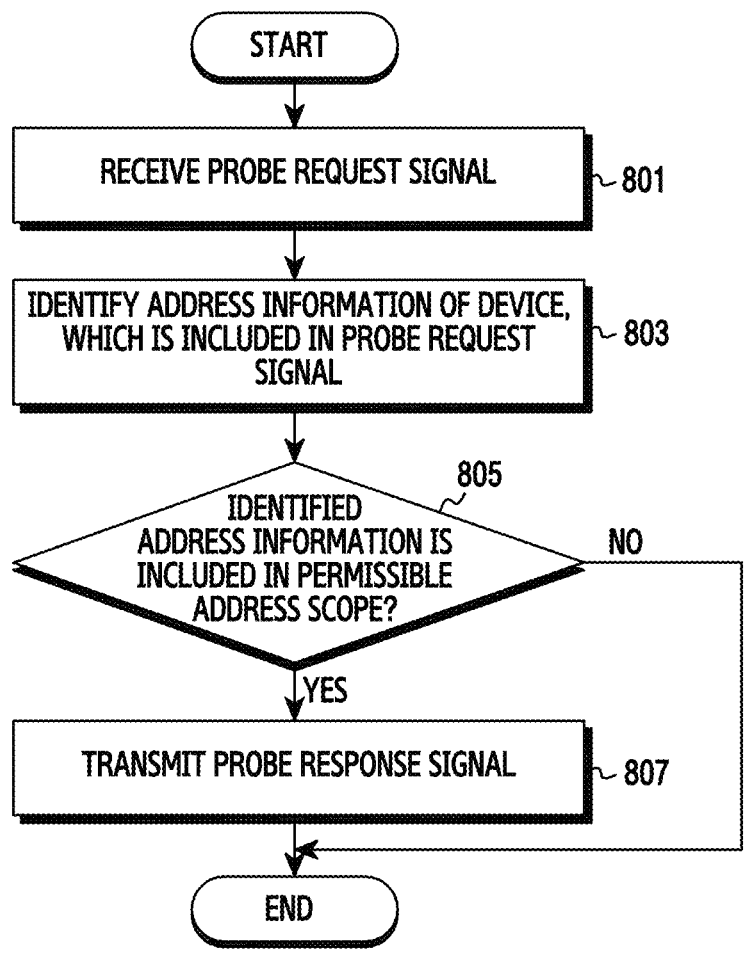
FIG. 8 is a view illustrating an operation procedure for selectively transmitting the probe response signal based on address information of a device from the device according to another further embodiment of the present invention.

FIG. 8 illustrates an operation procedure for selectively transmitting the probe response signal based on address information of a device from the device according to another further embodiment of the present invention.

Referring to FIG. 8, in step 801, the device 300 receives the probe request signal, and in step 803, the device 300 identifies the address information of the device, which is included in the probe request signal. For example, the device 300 may identify information recorded in "Address 1, Address 2 and Address 3" 402 field in the MAC header in the probe request signal of the structure as shown in FIG. 4.

The device 300 identifies whether the identified address information is included in an address scope of a permissible WLAN device. For example, the device 300 may determine whether a corresponding WLAN device is a device forming a network thereof based on the address information of the WLAN device transmitting the probe request signal, by previously allocating address information (e.g., IP address and MAC address) of a previously configured scope to WLAN devices forming one network.

When the identified address information is included in the address scope of the permissible WLAN device, in step 807, the device 300 transmits the probe response signal to the WLAN device transmitting the probe request signal, and ends the procedure according to an embodiment of the present invention.

In contrast, when the identified address information is not included in the address scope of the permissible WLAN device, the device 300 determines that the WLAN device transmitting the probe request signal is a device to which the WLAN connection is not admitted, does not transmit the probe response signal, and ends the procedure according to an embodiment of the present invention.

For example, when one network is formed with only a speaker and TVs, IP addresses of the speaker and TV may be allocated using addresses between xxx.xxx.xxx.100 to xxx.xxx.xxx.200. At this time, the device 300 operated as an AP or a GO of a corresponding network may respond in response to only a probe request signal transmitting a WLAN device having an IP address between xxx.xxx.xxx.100 to xxx.xxx.xxx.200.

In FIG. 8 described above, a method in which the probe response signal is transmitted only in the case wherein the address information of the WLAN device transmitting the probe request signal is included in the address scope of the permissible WLAN device by using scope information of an address allocated to the permissible WLAN devices is described. However, according to an embodiment, the probe response signal may be transmitted in only the case wherein the address information of the WLAN device transmitting the probe request signal is not included in the address scope of the WLAN device which is not admitted by using scope information of an address allocated to WLAN devices to which a connection is not admitted.

Figure 9:
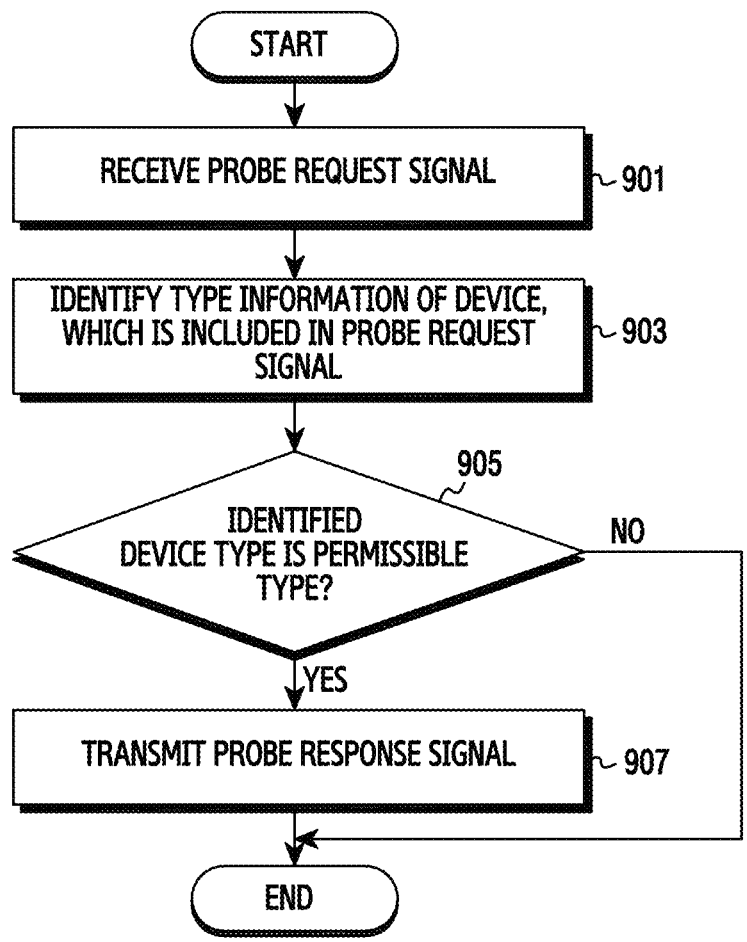
FIG. 9 is a view illustrating an operation procedure for selectively transmitting the probe response signal based on a device type from a device according to another further embodiment of the present invention.

FIG. 9 illustrates an operation procedure for selectively transmitting the probe response signal based on a device type from a device according to another further embodiment of the present invention.

Referring to FIG. 9, in step 901, the device 300 receives the probe request signal, and in step 903, the device 300 identifies type information of the device, which is included in the probe request signal. For example, the device 300 identifies device type information added to a vendor specific information element field included in the frame body 410, in the probe request message having the frame structure as shown in FIG. 4. The device type information may be information indicating a purpose of a corresponding device. For example, the device type information may include a TV, a speaker, a mobile phone, and the like.

In step 905, the device 300 checks whether the identified device type is a previously configured permissible device type. The device 300 may receive at least one piece of device type information for admitting the WLAN connection to the device 300 from a designer, a user or another device, and may store the received device type information.

When the identified device type is the permissible WLAN device type, in step 907, the device 300 transmits the probe response signal to the WLAN device transmitting the probe request signal, and ends the procedure according to an embodiment of the present invention.

In contrast, when the identified device type is not the permissible WLAN device type, the device 300 determines that the WLAN device transmitting the probe request signal is not a device to which the WLAN connection is not admitted, does not transmit the probe response signal, and ends the procedure according to an embodiment of the present invention.

For example, when one network is formed with only a speaker and TVs, the device 300 may respond only to a probe request signal transmitted from a WLAN device of a speaker or TV type, by previously storing information indicating that the type of the WLAN admission device is a speaker type and a TV type.

In FIG. 9 described above, a method in which the device 300 transmits the probe response signal to only the WLAN device having the permissible device type, by previously configuring or storing the type information of the WLAN device to which the WLAN connection is admitted is described. However, according to an embodiment, a method in which the device 300 transmits the probe response signal to only a device which is not a non-permissible device type, by previously configuring or storing type information of a WLAN device to which the WLAN connection is not admitted.

Figure 10:
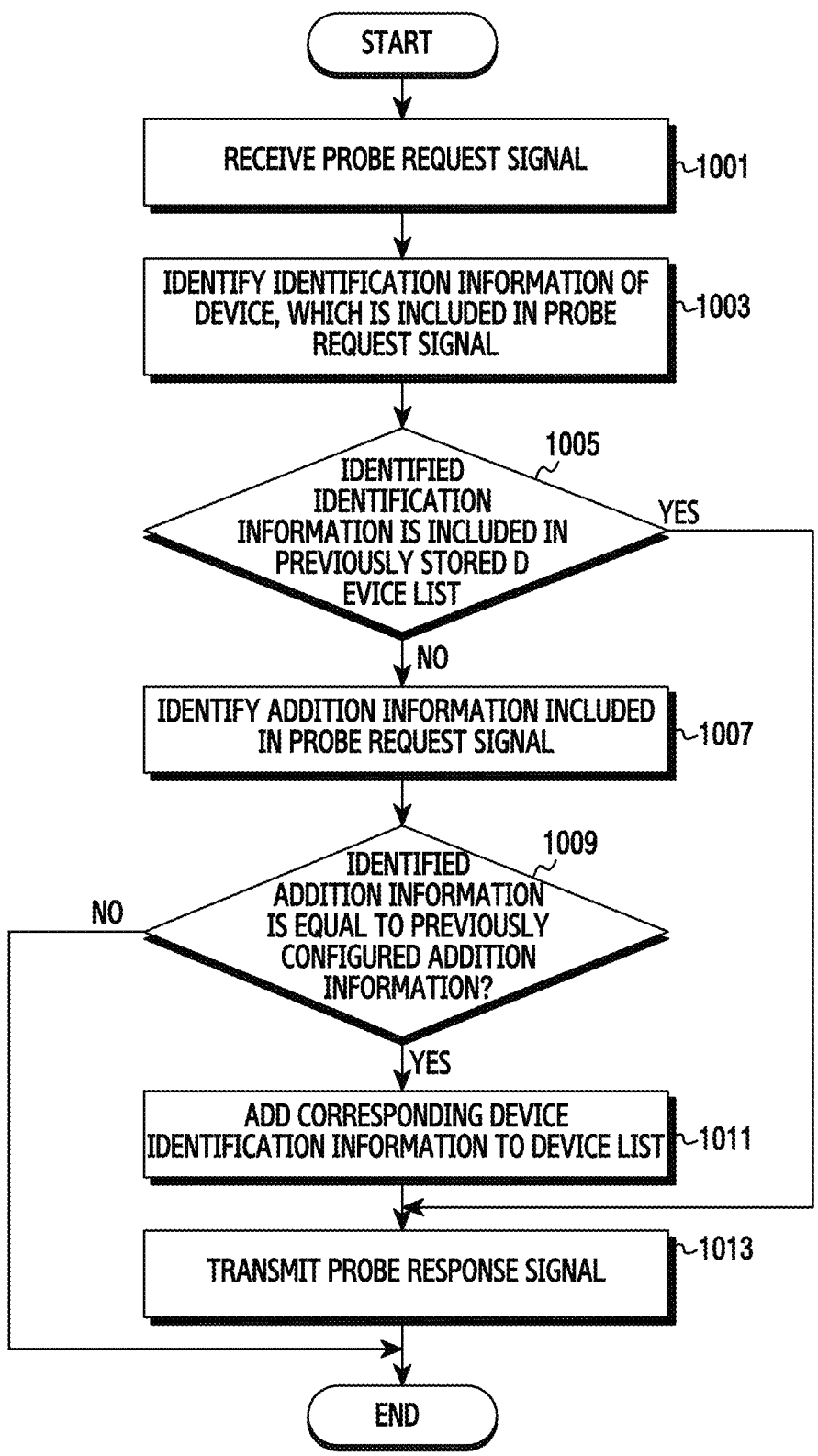
FIG. 10 is a view illustrating an operation procedure for selectively transmitting the probe response signal based on a device list and information added to the probe request message from a device according to another further embodiment of the present invention.

FIG. 10 illustrates an operation procedure for selectively transmitting the probe response signal based on a device list and information added to the probe request message from a device according to another further embodiment of the present invention.

Referring to FIG. 10, in step 1001, the device 300 receives the probe request signal, and in step 1003, the device 300 identifies identification information of the device, which is included in the probe request signal. For example, the identification information of the device may include at least one of a device ID, a MAC address and IP address.

In step 1005, the device 300 checks whether the identification information of the WLAN device transmitting the probe request signal is included in a previously stored device list. The previously stored device list may include identification information of WLAN devices to which the connection of the WLAN is admitted by the device. The previously stored device list may be generated and updated based on step 1009 and step 1011 described below. Therefore, when there is not the previously stored device list, that is, when there is not the WLAN device performing the WLAN connection to the device 300, after step 1001, the device 300 may omit step 1003 and step 1005 and may directly perform step 1009.

When it is determined that the identification information of the WLAN device transmitting the probe request signal is included in the previously stored device list, in step 1007, the device transmits the probe response signal to the WLAN device transmitting the probe request signal, and ends the procedure according to an embodiment of the present invention.

In contrast, when it is determined that the identification information of the WLAN device transmitting the probe request signal is not included in the previously stored device list, in step 1007, the device 300 identifies addition information included in the probe request signal. For example, the device 300 identifies information added to a vendor specific information element field included in the frame body 410, in the probe request message having the frame structure as shown in FIG. 4.

In step 1009, it is checked whether the addition information included in the probe request signal is equal to previously configured addition information. For example, the device 300 may previously receive and store the addition information for admitting the WLAN connection to the device from a designer, a user or another device, and determines whether the stored addition information is equal to the addition information included in the probe request signal. Here, the addition information may be authentication information, a device type and information for an operation of a specific algorithm.

When the identified addition information is the same as the previously configured addition information, in step 1011, the device 300 adds the identification information of the WLAN device transmitting the probe request signal to the device list indicating the WLAN device to which the WLAN connection is admitted. In step 1013, the device 300 transmits the probe response signal to the WLAN device transmitting the probe request signal, and ends the procedure according to an embodiment of the present invention. Here, step 1013 and step 1011 may be simultaneously performed, or step 1013 may be performed before step 1011.

In contrast, when the identified addition information is not equal to the previously configured addition information, the device 300 determines that the WLAN device transmitting the probe request signal is not a device to which the WLAN connection is not admitted, does not transmit the probe response signal, and ends the procedure according to an embodiment of the present invention.

Figure 11A:
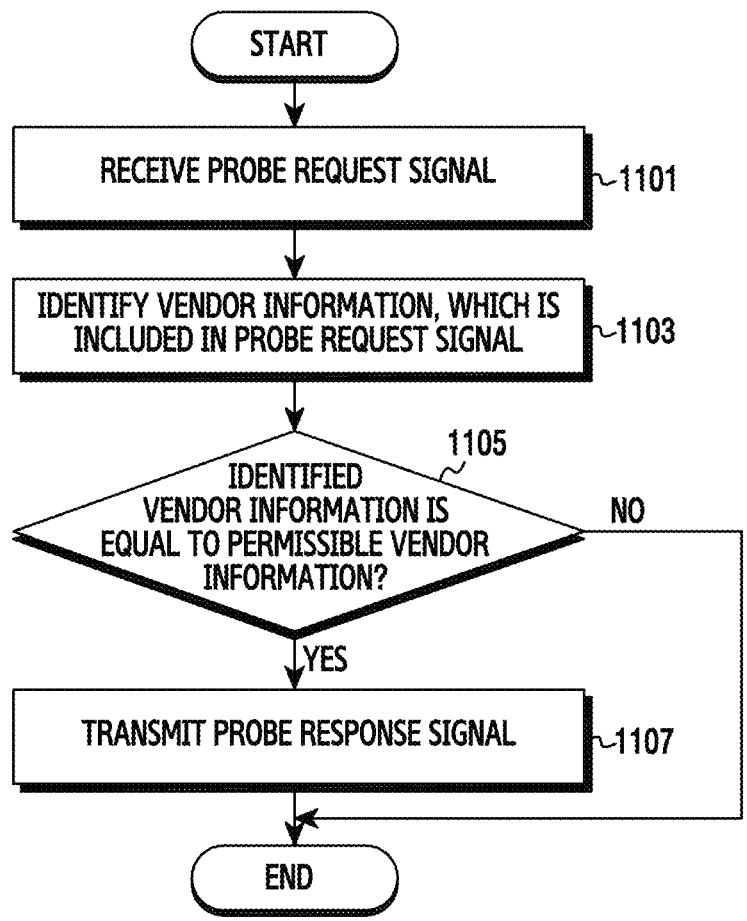
FIG. 11A is a view illustrating an operation procedure for selectively transmitting the probe response signal based on vendor information from a device according to another further embodiment of the present invention.

FIG. 11A illustrates an operation procedure for selectively transmitting the probe response signal based on vendor information from a device according to another further embodiment of the present invention.

Referring to FIG. 11A, in step 1011, the device 300 receives the probe request signal, and in step 1103, the device 300 identifies the vendor information (e.g., a manufacturing company) of the device, which is included in the probe request signal. For example, the device 300 identifies vendor information added to a vendor specific information element field included in the frame body 410, in the probe request message having the frame structure as shown in FIG. 4. The vendor information may be information indicating a manufacturing company of a corresponding device.

In step 1105, the device checks whether the identified vendor information is equal to permissible vendor information. For example, the device 300 checks whether the manufacturing company information included in the probe request signal is equal to manufacturing company information of the device 300. As another example, the device 300 checks whether the vendor information included in the probe request signal is equal to previously configured permissible vendor information.

When the identified vendor information is equal to the permissible vendor information, in step 1107, the device 300 transmits the probe response signal to the WLAN device transmitting the probe request signal, and ends the procedure according to an embodiment of the present invention.

In contrast, the identified vendor information is not equal to the permissible vendor information, the device 300 determines that the WLAN device transmitting the probe request signal is not a device to which the WLAN connection is not admitted, does not transmit the probe response signal, and ends the procedure according to an embodiment of the present invention.

Figure 11B:
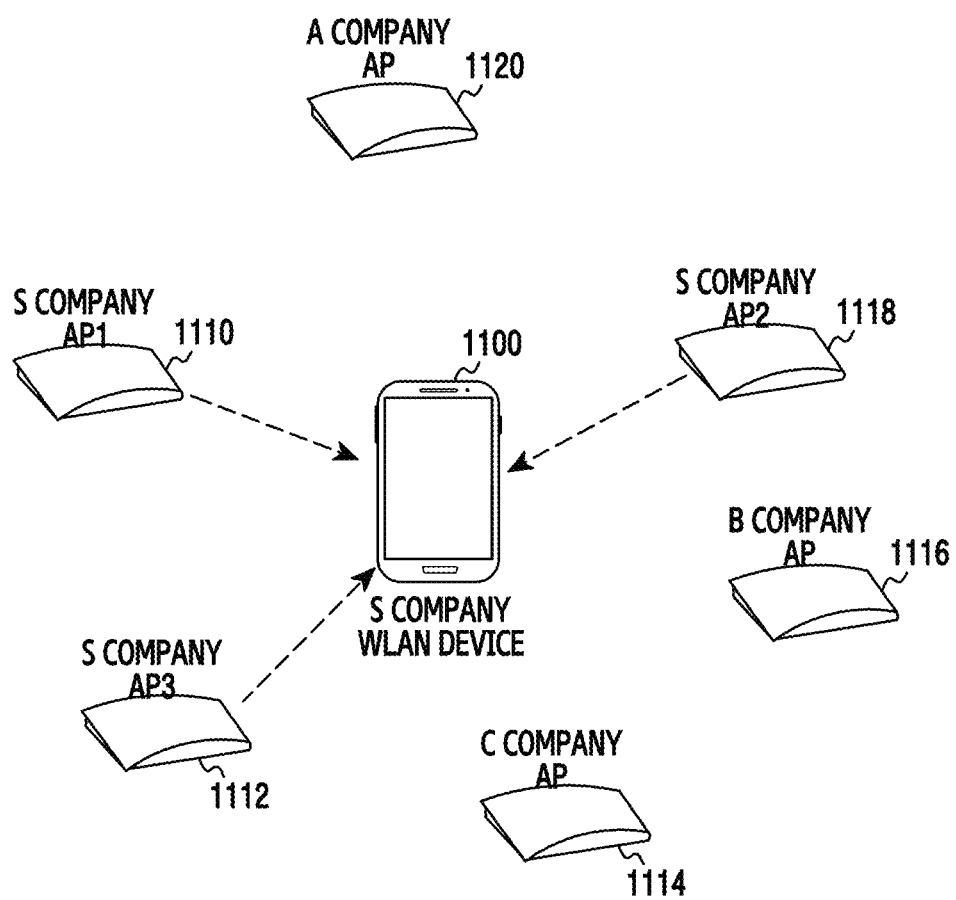
FIG. 11B is a view illustrating an example in which the probe response signal is selectively transmitted based on vendor information in a WLAN system according to another further embodiment of the present invention.

FIG. 11B illustrates an example in which the probe response signal is selectively transmitted based on vendor information in a WLAN system according to another further embodiment of the present invention.

As shown in FIG. 11B, a WLAN device 1100 manufactured in S company may broadcast information indicating that a vendor thereof is "S company" by including the information in the probe request message. Thus, a plurality of APs 1110 to 1120 positioned around the WLAN device 1100 may receive the probe request message. In this case, APs 1110, 1112 and 1118 of which a vendor is "S company" among the plurality of APs 1110 to 1120 may transmit the probe response message, and remained APs, that is APs 1114, 1116 and 1120 of which a vendor is not "S company" may not transmit the probe response message.

Figure 12A:
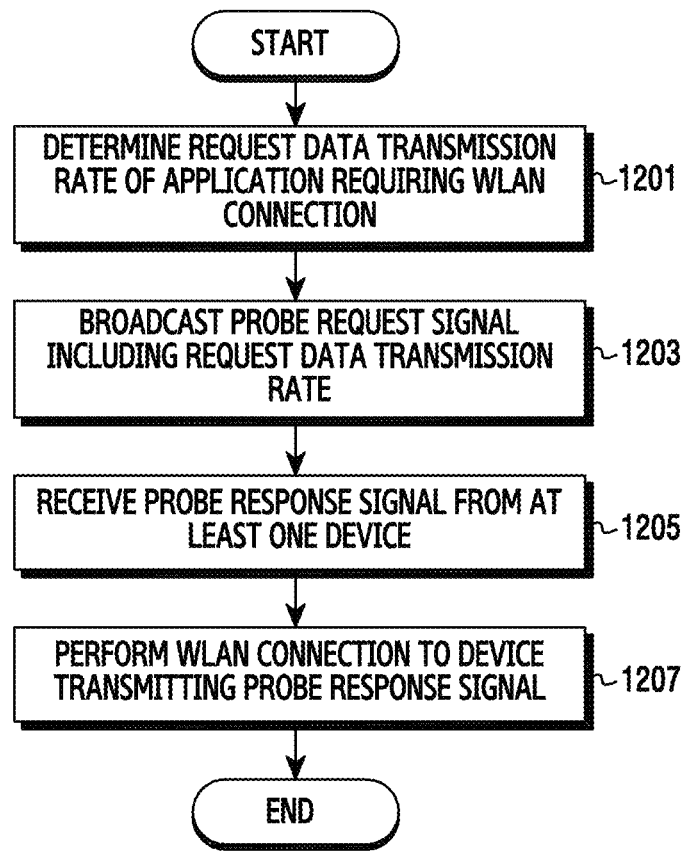
FIG. 12A is a view illustrating a procedure for transmitting the probe request signal from a device according to another further embodiment of the present invention.

FIG. 12A illustrates a procedure for transmitting the probe request signal from a device according to another further embodiment of the present invention.

Referring to FIG. 12A, in step 1201, a device 302 determines a request data transmission rate of an application requiring a WLAN connection. According to an embodiment, the device 302 may detect a generation of a WLAN connection event by an execution of at least one application, and may determine the data transmission rate required by the executed application. When a plurality of applications request the WLAN connection, the device 302 may determine a data transmission rate requested by each of the plurality of applications, or may determine a data transmission rate requested by a whole of the plurality of applications. According to an embodiment, information on the data transmission rate requested by each application may be previously stored in the device 302.

In step 1203, the device 302 broadcasts the probe request signal including the request data transmission rate. For example, the device 300 may add information on the request data transmission rate to the vendor specific information element field included in the frame body 410, in the probe request message having the frame structure as shown in FIG. 4.

Next, in step 1205, the device 302 receives the probe response signal from at least one device 300, and in step 1207, connects the WLAN to the device 300 transmitting the probe response message. For example, the device 302 may determine the device 300 transmitting the probe response message is an AP or GO that may satisfy the request data transmission rate of the application executed in the device 302, and may receive a service by a corresponding application by performing the WLAN connection to the corresponding device 300.

Figure 12B:
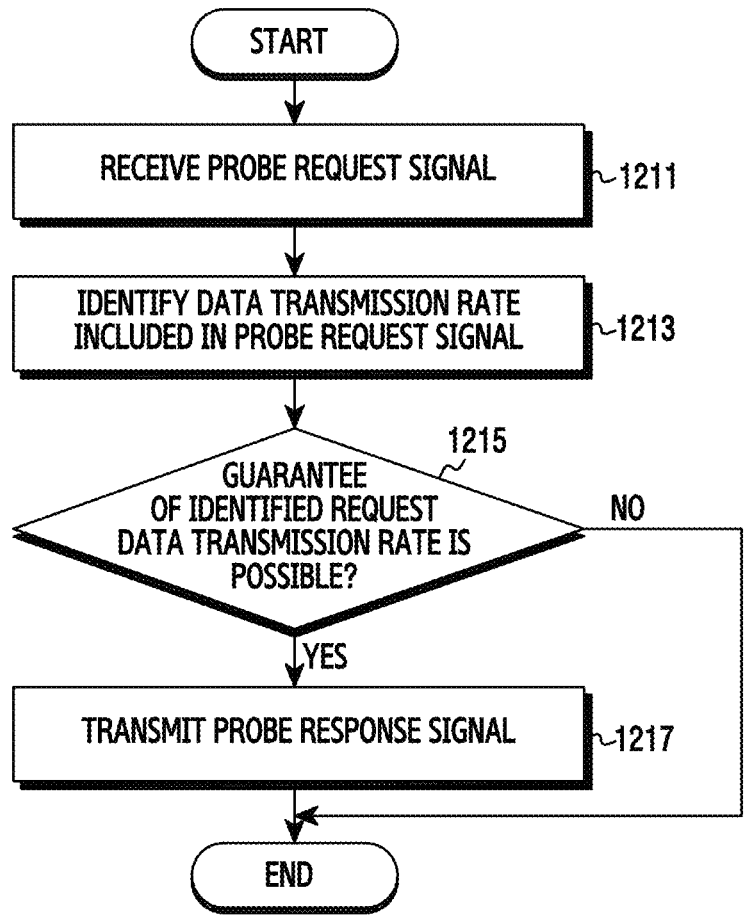
FIG. 12B is a view illustrating an operation procedure for selectively transmitting the probe response signal based on a data transmission rate from a device according to another further embodiment of the present invention.

FIG. 12B illustrates an operation procedure for selectively transmitting the probe response signal based on a data transmission rate from a device according to another further embodiment of the present invention.

Referring to FIG. 12B, in step 1211, the device 300 receives the probe request signal, and in step 1213, the device 300 identifies a request data transmission rate included in the probe request signal. For example, the device 300 may identify request data transmission rate information added to the vendor specific information element field included in the frame body 410, in the probe request message having the frame structure as shown in FIG. 4.

In step 1215, the device 300 checks whether the identified request data transmission rate may be guaranteed. For example, the device 300 may identify a providable request data transmission rate therefrom, and when the providable request data transmission rate therefrom is equal to or larger than the request data transmission rate included in the probe request signal, the device 300 may determine that the guarantee of the request data transmission rate may be possible. In contrast, when the providable request data transmission rate therefrom is smaller than the request data transmission rate included in the probe request signal, the device may determine that the guarantee of the request data transmission rate may be impossible.

When the guarantee of the identified request data transmission rate is possible, in step 1217, the device 300 transmits the probe response signal to the WLAN device transmitting the probe request signal, and ends the procedure according to an embodiment of the present invention.

In contrast, when the guarantee of the identified request data transmission rate is impossible, the device 300 does not transmit the probe response signal, and ends the procedure according to an embodiment of the present invention.

Figure 12C:
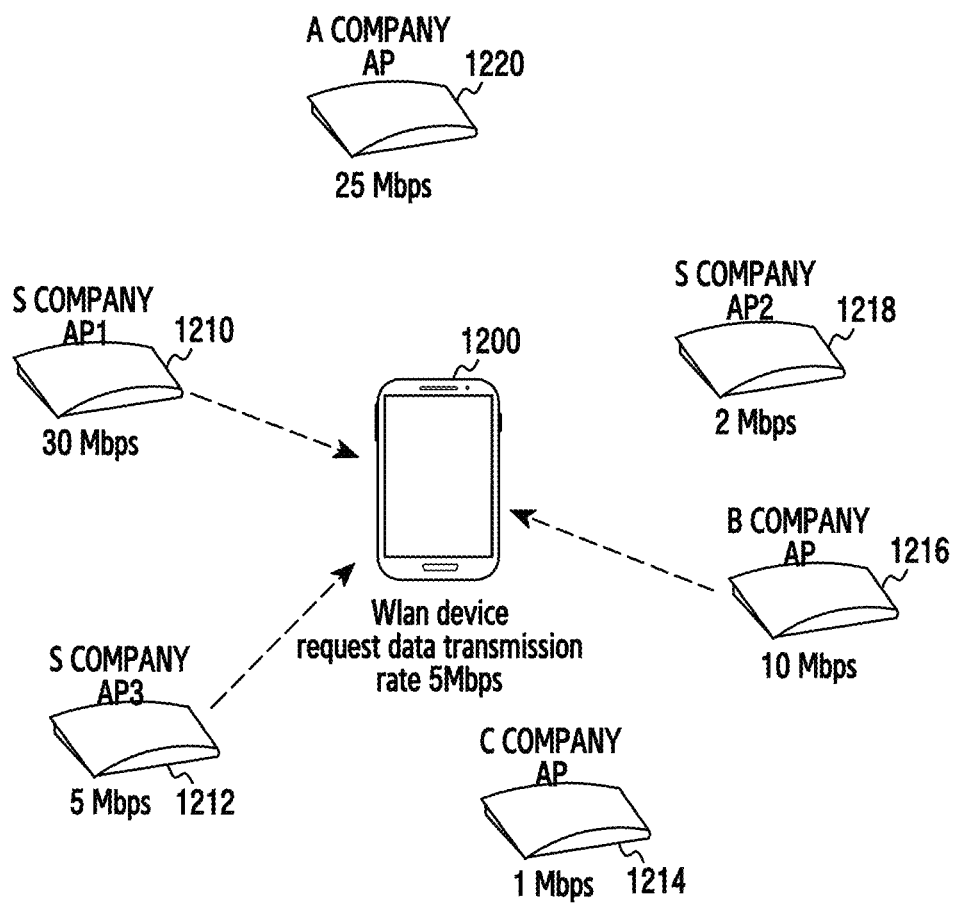
FIG. 12C is a view illustrating an example in which the probe response signal is selectively transmitted base on a data transmission rate in a WLAN system according to another further embodiment of the present invention.

FIG. 12C illustrates an example in which the probe response signal is selectively transmitted base on a data transmission rate in a WLAN system according to another further embodiment of the present invention.

As shown in FIG. 12C, a WLAN device 1200 may broadcast information indicating that a request data transmission rate thereof is 5 Mbps by including the information in the probe request message. Thus, a plurality of APs 1210 to 1220 positioned around the WLAN device 1200 may receive the probe request message. In this case, among the plurality of APs 1210 to 1220, APs 1210, 1212, 1216 and 1220 of which a providable data transmission rate is equal to or larger than 5 Mbps may transmit the probe response message, and remaining APs, that is APs 1214 and 1218 of which a providable data transmission rate is smaller than 5 Mbps may not transmit the probe response message.

In FIGS. 12B and 12C, selectively transmitting the probe response signal using only the request data transmission rate of the device transmitting the probe request signal, by the device 300 is described. However, according to an embodiment, as shown in FIGS. 6 to 11B, after the device 300 checks whether the device transmitting the probe request signal is a device of which a WLAN connection admission is possible, using at least one of device identification information, a device status, device address information, a device type, a previously stored device list, authentication information and vendor information, in the case of the device of which the WLAN connection admission is possible, the device 300 may selectively transmit the probe response signal based on the request data transmission rate. For example, even though the WLAN device transmitting the probe request signal is identified as the device to which the WLAN connection is admitted based on at least one method in FIGS. 6 to 11B, the device 300 may additionally check whether the device 300 may guarantee the data transmission rate requested by the WLAN device, and may selectively transmit the probe response signal to the WLAN device. According to an embodiment of the present invention, the device 300 may determine whether the device 300 responds in response to the probe request message by using and mixing at least two methods described above with reference to FIGS. 6 to 13C.

In an embodiment of the present invention, in a WLAN system, a device receiving a probe request message selectively transmits a probe response message based on at least one of information included in a probe request message and information recorded in the device. Therefore, transmitting an unnecessary probe response message is prevented. Thus, interference is reduced while improving resource efficiency. Accordingly, a transmission rate in a system can be improved. In addition, a situation in which a plurality of probe response messages are simultaneously generated and thus a network becomes complex can be prevented. Interference can be reduced while improving resource efficiency. In addition, in the WLAN system, a device receiving a probe request message transmits a probe response message only when the device can provide service quality requested by a counterpart device transmitting the probe request message. Therefore, the present invention can guarantee service quality of a counterpart WLAN device.

The above described components of the device according to various embodiments of the present invention may be formed of one or more components, and a name of a corresponding component element may be changed based on the type of the device. The electronic device according to the present invention may include one or more of the aforementioned components or may further include other additional components, or some of the aforementioned components may be omitted. Further, some of the components of the electronic device according to the various embodiments of the present invention may be combined to form a single entity, and thus, may equivalently execute functions of the corresponding elements prior to the combination.

The "module" used in various embodiments of the present invention may refer to, for example, a "unit" including one of hardware, software, and firmware, or a combination of two or more of the hardware, software, and firmware. The "module" may be interchangeably used with, for example, the term "unit", "logic", "logical block", "component", or "circuit". The "module" may be a minimum unit of an integrated component element or a part thereof. The "module" may be the smallest unit that performs one or more functions or a part thereof. The "module" may be mechanically or electronically implemented. For example, the "module" according to various embodiments of the present invention may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least some of the devices (e.g., modules or functions thereof) or methods (e.g., operations) according to the various embodiments of the present invention may be implemented as, for example, instructions stored computer readable storage media in the form of programming modules. When the command is executed by one or more processors (for example, the processor 320), the one or more processors may execute a function corresponding to the command. The computer-readable storage medium may be, for example, the memory 330. At least a part of the programming module may be implemented (for example, executed) by, for example, the processor 320. At least a part of the programming module may, for example, include a module, a program, a routine, a set of instructions, or a process for performing at least one function.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

A programming module according to the present invention may include at least one of the described component elements, a few of the component elements may be omitted, or additional component elements may be included. Operations executed by a module, a programming module, or other component elements according to various embodiments of the present invention may be executed sequentially, in parallel, repeatedly, or in a heuristic manner. Further, some operations may be executed according to another order or may be omitted, or other operations may be added.

According to various embodiments, a storage medium having commands stored therein is provided. The commands are configured to allow one or more processors to perform one or more operations when the commands are executed by the one or more processors. The one or more operations may include an operation of transmitting or receiving one or more signals of a first signal corresponding to a first communication network and a second signal corresponding to a second communication network and an operation of, when one or more signals are received, distributing the one or more signals to a first communication control module for processing the first signal and a second communication control module for processing the second signal based on services provided by the electronic device, which correspond to the first signal and the second signal.

Although specific exemplary embodiments have been described in the detailed description of the present invention, various change and modifications may be made without departing from the spirit and scope of the present invention.

Therefore, the scope of the present invention should not be defined as being limited to the embodiments, but should be defined by the appended claims and equivalents thereof.

The invention claimed is:

1. A method of a first device for a wireless local area network (WLAN) connection in a WLAN system, the method comprising:
receiving, from a second device, a probe request message including identification information of the second device;
identifying a predetermined status information of the first device;
if the predetermined status information indicates a first status which admits a connection of a new device, determining whether to transmit a probe response signal in response to the probe request message, wherein the predetermined status information indicates the first status in a preconfigured time duration;
if the predetermined status information indicates a second status which does not admit the connection of the new device and admits a connection of a second device having a connection history with the first device, checking whether the connection history of the second device is stored in the first device, and, determining whether to transmit the probe response signal in response to the probe request message based on a comparison between information included in the received probe request message and the connection history when the connection history of the second device is stored in the first device; and
transmitting the probe response signal in response to the probe request message when it is determined to transmit the probe response signal.

2. The method of claim 1,
wherein the information included in the received probe request message includes at least one of address information of the second device, type information of the second device, authentication information of the second device, vendor information of the second device, a request data transmission rate of the second device, or algorithm operation information of the second device.

3. The method of claim 1, wherein the information regarding at least one allowable connection includes at least one of a WLAN connection admission device list, a WLAN connection admission device type, authentication information for the WLAN connection, additional information for the WLAN connection, address information of the WLAN connection admission device, WLAN connection history information indicating other devices which have been connected to the first device through a WLAN, or WLAN connection admission vendor information.

4. The method of claim 1, wherein the determining of whether to transmit the probe response signal in response to the probe request message comprises:
determining whether the second device is a device capable of the WLAN connection based on the comparison between the information included in the received probe request message and the information regarding at least one allowable connection; and
determining to transmit the probe response signal to the second device only in a case where the second device is capable of the WLAN connection.

5. The method of claim 1, further comprising:
generating and updating a WLAN connection admission device list including the second device determined as a device capable of the WLAN connection.

6. The method of claim 1, wherein the determining of whether to transmit the probe response signal in response to the probe request message comprises:
identifying the identification information of the second device included in the probe request message;
determining whether the identification information is included in the WLAN connection history information which is pre-stored in the first device; and
determining to transmit the probe response signal to the second device when the identification information is included in the WLAN connection history information.

7. The method of claim 1, wherein the determining of whether to transmit the probe response signal in response to the probe request message comprises:
identifying address information included in a header of the probe request message;
determining whether the address information corresponds to an address range which is already configured in the first device; and
determining to transmit the probe response signal to the second device when the address information corresponds to the address range which is already configured.

8. The method of claim 1,
wherein the determining of whether to transmit the probe response signal in response to the probe request message comprises:
identifying information added in a vendor specific information element field included in a frame body of the probe request message,
determining whether the added information corresponds to an additional information which is already configured in the first device, and
determining to transmit the probe response signal to the second device when the added information corresponds to the addition information which is already configured in the first device, and
wherein the added information includes at least one of a device type, authentication information, or information for an algorithm operation.

9. The method of claim 1, wherein the determining of whether to transmit the probe response signal in response to the probe request message comprises:
identifying vendor information of the second device transmitting the probe request message,
determining whether the vendor information of the second device is equal to vendor information of the first device, and
determining to transmit the probe response signal to the second device when the vendor information of the second device is equal to the vendor information of the first device.

10. A first device for a wireless local area network (WLAN) connection in a WLAN system, the first device comprising:
a communication module configured to communicate with at least one second device; and
at least one processor that configured to:
receive, from a second device, a probe request message including identification information of the second device,
identify a predetermined status information of the first device,
if the predetermined status information indicates a first status which admits a connection of a new device, determine whether to transmit a probe response signal in response to the probe request message, wherein the predetermined status information indicates the first status in a preconfigured time duration,
if the predetermined status information indicates a second status which does not admit the connection of the new device and admits a connection of a second device having a connection history with the first device, check whether the connection history of the second device is stored in the first device, and, determine whether to transmit the probe response signal in response to the probe request message based on a comparison between information included in the received probe request message and the connection history when the connection history of the second device is stored in the first device, and
transmit the probe response signal in response to the probe request message when it is determined to transmit the probe response signal.

11. The first device of claim 10, wherein the information included in the received probe request message includes at least one of address information of the second device, type information of the second device, authentication information of the second device, vendor information of the second device, a request data transmission rate of the second device, or algorithm operation information of the second device.

12. The first device of claim 10, wherein the information regarding at least one allowable connection includes at least one of a WLAN connection admission device list, a WLAN connection admission device type, authentication information for the WLAN connection, additional information for the WLAN connection, address information of the WLAN connection admission device, WLAN connection history information indicating other devices which have been connected to the first device through a WLAN, or WLAN connection admission vendor information.

13. The first device of claim 10, wherein the at least one processor is further configured to:
determine whether the second device is a device capable of the WLAN connection based on the comparison between the information included in the received probe request message and the information regarding the at least one allowable connection,
determine to transmit the probe response signal to the second device only in a case where the second device is capable of the WLAN connection, and
transmit the probe response signal to the second device when it is determined to transmit the probe response signal to the second device.

14. The first device of claim 10, wherein the at least one processor is further configured to generate and update a WLAN connection admission device list including the second device determined as a device capable of the WLAN connection.

15. The first device of claim 10, wherein the at least one processor is further configured to:
identify the identification information of the second device included in the probe request message,
determine whether the identification information is included in the WLAN connection history information which is pre-stored in the first device,
determine to transmit the probe response signal to the second device when the identification information is included in the WLAN connection history information, and
transmit the probe response signal to the second device when it is determined to transmit the probe response signal to the second device.

16. The first device of claim 10, wherein the at least one processor is further configured to:
identify address information included in a header of the probe request message,
determine whether the address information corresponds to an address range which is already configured in the first device,
determine to transmit the probe response signal to the second device when the address information corresponds to the address range which is already configured, and
transmit the probe response signal to the second device when it is determined to transmit the probe response signal to the second device.

17. A method of a second device for a wireless local area network (WLAN) connection in a WLAN system, the method comprising:
sensing a WLAN connection event by at least one application execution;
broadcasting a probe request message for the WLAN connection; and
receiving, from a first device, a probe response signal in response to the probe request message, when the probe response signal is transmitted from the first device,
wherein the probe response signal is received if a predetermined status information of the first device indicates a first status which admits a connection of a new device, wherein the predetermined status information indicates the first status in a preconfigured time duration, or
wherein the probe response signal is received if the predetermined status information of the first device indicates a second status which does not admit the connection of the new device and admits a connection of the second device having a connection history with the first device, and the probe response signal is determined to be transmitted based on a comparison between information included in the probe request message and the connection history when the connection history of the second device is stored in the first device.

18. A second device for a wireless local area network (WLAN) connection in a WLAN system, the second device comprising:
a communication module configured to communicate with at least one first device; and
at least one processor configured to:
sense a WLAN connection event by at least one application execution,
broadcast a probe request message for the WLAN connection, and
receive, from a first device, a probe response signal in response to the probe request message, when the probe response signal is transmitted from the first device,
wherein the probe response signal is received if a predetermined status information of the first device indicates a first status which admits a connection of a new device, wherein the predetermined status information indicates the first status in a preconfigured time duration, or
wherein the probe response signal is received if the predetermined status information of the first device indicates a second status which does not admit the connection of the new device and admits a connection of the second device having a connection history with the first device, and the probe response signal is determined to be transmitted based on a comparison between information included in the probe request message and the connection history when the connection history of the second device is stored in the first device.

* * * * *